Figure 1:
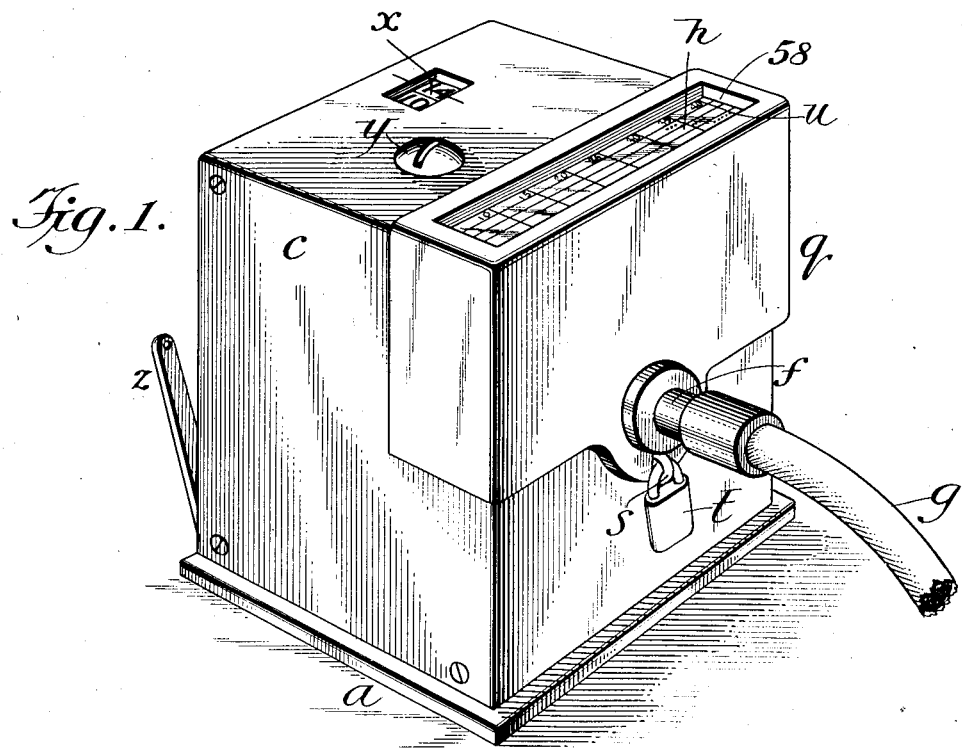

No. 890,100. PATENTED JUNE 9, 1908.
A. SHEDLOCK.
SPEED INDICATOR AND RECORDER.
APPLICATION FILED JUNE 1, 1905.

3 SHEETS—SHEET 1.

Witnesses
A. R. Appleman
Arthur E. Platz

Inventor
Alfred Shedlock.

No. 890,100. PATENTED JUNE 9, 1908.
A. SHEDLOCK.
SPEED INDICATOR AND RECORDER.
APPLICATION FILED JUNE 1, 1905.
3 SHEETS—SHEET 2.
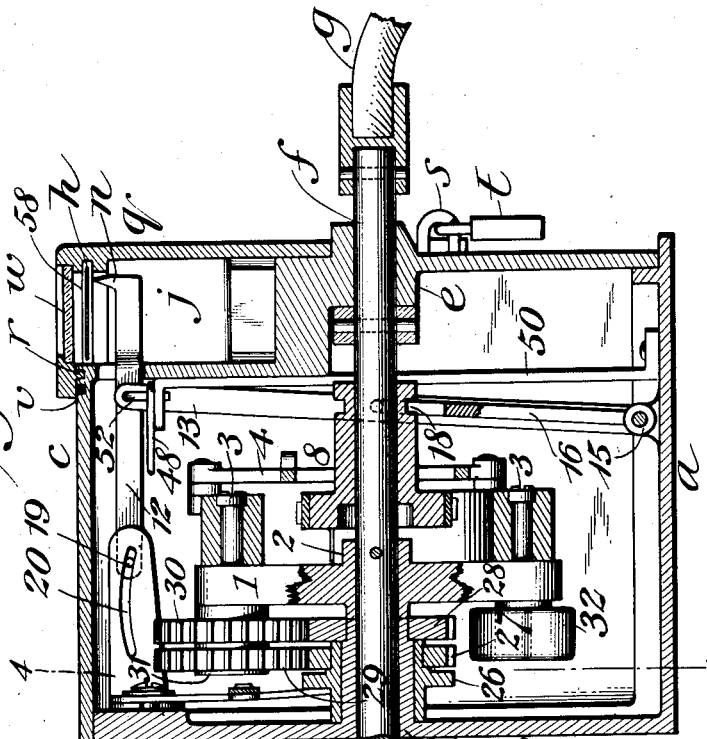
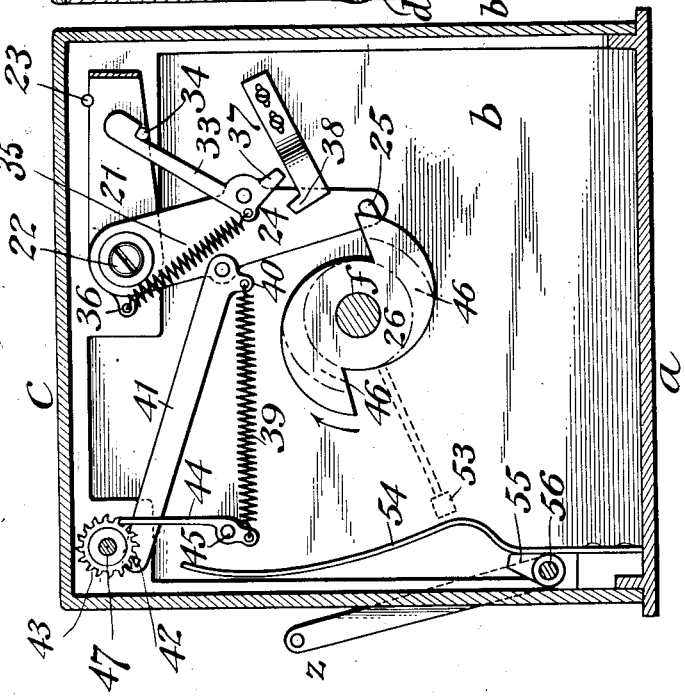
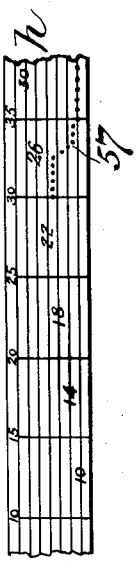
Witnesses
Inventor
Alfred Shedlock.

No. 890,100.
PATENTED JUNE 9, 1908.
A. SHEDLOCK.
SPEED INDICATOR AND RECORDER.
APPLICATION FILED JUNE 1, 1905.
3 SHEETS—SHEET 3.
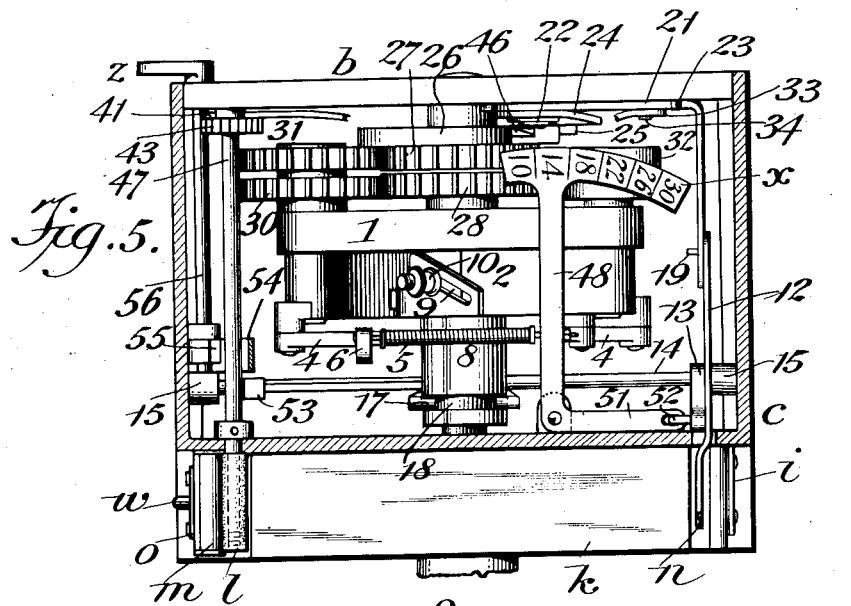
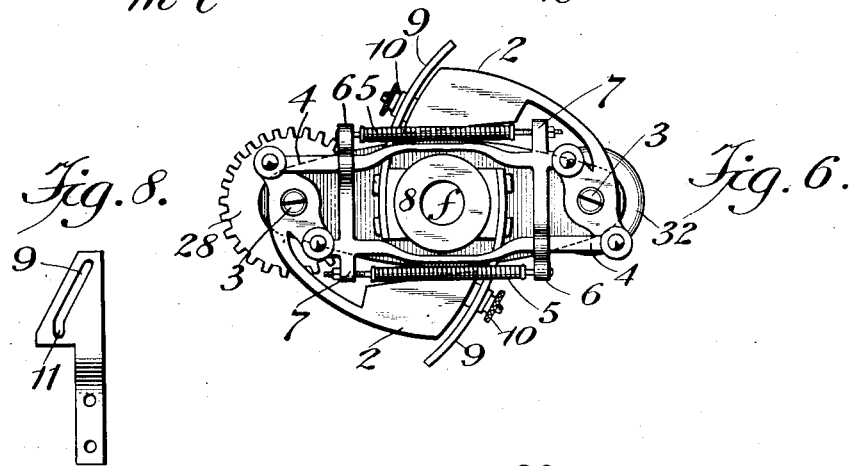
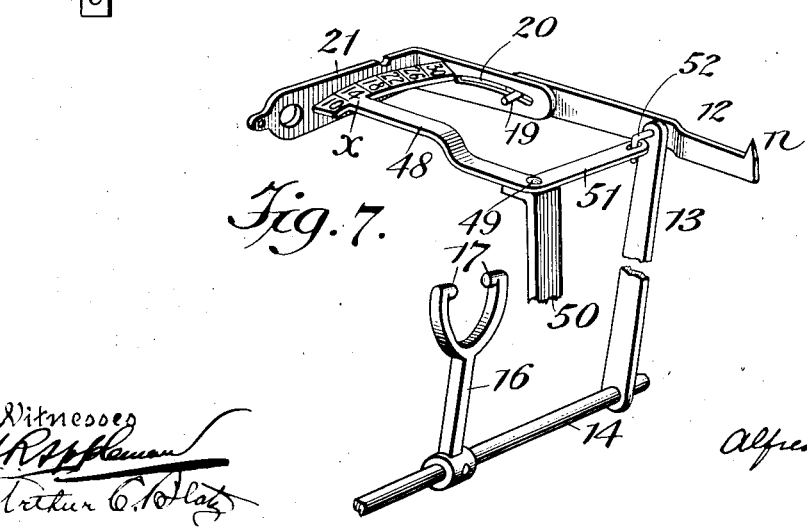
Witnesses
Inventor
Alfred Shedlock

UNITED STATES PATENT OFFICE.

ALFRED SHEDLOCK, OF JERSEY CITY, NEW JERSEY, ASSIGNOR OF ONE-HALF TO JAMES A. HUDSON, OF NEW YORK, N. Y.

SPEED INDICATOR AND RECORDER.

No. 890,100.      Specification of Letters Patent.      Patented June 9, 1908.

Application filed June 1, 1905. Serial No. 263,222.

*To all whom it may concern:*

Be it known that I, ALFRED SHEDLOCK, a citizen of the United States, and a resident of Jersey City, Hudson county, State of New Jersey, have invented Improvements in Speed Indicators and Recorders, of which the following is a specification.

The object of this invention is to provide an apparatus for use on vehicles, particularly self propelled vehicles, that will produce a permanent record of distances traveled and the various rates of speed of travel of the vehicle, a visual indicator of the speed of the vehicle at any and at all times while it is traveling; and an audible indication, adapted to be produced at will, when the vehicle is traveling at a speed in excess of a predetermined speed or a prescribed limit of speed.

This invention contemplates inclosing all of the operating and indicating parts or devices in a secured casing to prevent interference or tampering with said devices, and so locating the permanent record of travel and speeds that the same will be visible, and open to common inspection, showing distances run and speeds made by the vehicle for a considerable period just preceding the time of inspection, or the time the motion of the vehicle is arrested.

Figure 2:
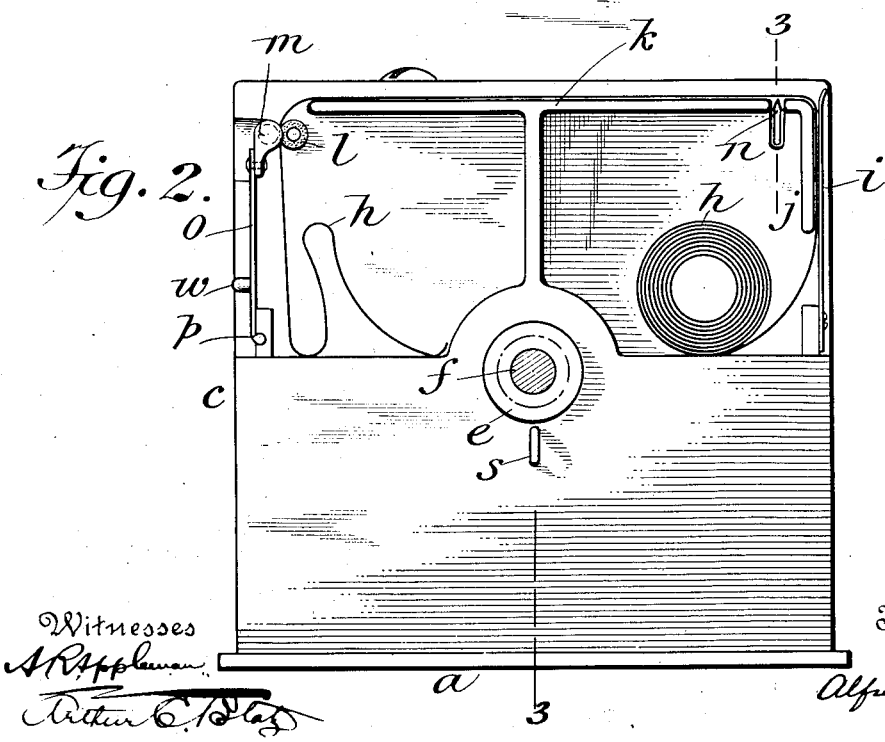

This apparatus includes a controller which is suitably connected to and positively moves with a part of the vehicle that is always in action when the vehicle is traveling, preferably one of the wheels of the same; a feeding device for moving a permanent record receiver in accordance with the distances traveled, actuated by or in conjunction with the controller; a marking device, preferably in the form of a puncturing point, set into position to mark the record receiver to indicate different speeds of the vehicle by connecting mechanisms with the controller; means for operating the marking device at intervals to indicate distances run by and the speeds of the vehicle at the times of marking, on the record receiver, actuated by or in conjunction with the controller; a visual speed indicator actuated to move commensurately with the speeds of the vehicle by suitable connection with the controller, to show the rates of speeds, as miles per hour, of travel of the vehicle; and a sound producing device adapted to be put in action, at will, from any part of the vehicle, by means of a connecting cord or chain attached to its operating lever located at the end of the casing of the apparatus, so constructed and arranged that audible indications will be produced only when the vehicle is traveling at speeds above a given speed, predetermined, which may be a legally prescribed speed. These and other special features of construction will now be fully described by reference had to the accompanying drawings, in which;

Figure 1, is a perspective view of the machine, complete. Fig. 2, is an end view with the cover removed, showing the record receiving paper, its puncturing and feeding devices. Fig. 3, is a vertical section, taken on the line 3, 3, Fig. 2. Fig. 4, is a transverse section, taken on the line 4, 4, Fig. 3, and also showing the alarm device. Fig. 5, is a plan view, with the top of the casing removed. Fig. 6, is a face view of the governor or distance and speed indicator controller. Fig. 7, is a perspective view of the record producing device and speed indicating scale. Fig. 8, is a detached view of one of the slotted arms of the speed indicator controller, and Fig. 9, shows a portion of the record receiving paper.

All the mechanism is contained in a closed box or casing, consisting of a base *a* and an end wall *b* included in one piece or casting; and the other wall, the two sides and the top of the casing is included in one piece or casting *c*. These two parts are secured together by screws, as shown at Fig. 1. Bearings *d* and *e* are centrally located in the end wall *b* and the end wall of the casing *c* respectively, and they carry the shaft *f*, driven by any suitable means, as a flexible shaft *g*, from any positively rotating part of the vehicle to which the machine is attached, as for instance one of the traveling or guiding wheels. In the end wall of the case *c* two recesses are formed, in one of which a roll of record receiving paper *h* is placed, passing therefrom between a spring *i* and side plate or wall *j*, over a table *k* and between a feeding roller *l* and a pressure roller *m*, hence it enters the other recess, after receiving the record marks or punctures. The table *k* has a slot through which the record marking or puncturing device *n* passes to mark the paper *h*; and the pressure roller *m* is carried by a flexible arm *o* hinged at its lower end to a lug *p* of the casing *c*, in such manner as to be free to move to and from the feed roller *l*. A cover *q* which is formed to protect the paper h closes the recesses in and the upper end of the casing c above the table k, it is provided with pins r, one being shown at Fig. 3, which enter holes in the top of the casing, and it has an opening in its end which snugly embraces the boss of the bearing e, thereby holding the cover firmly on the casing; and it is also formed to straddle the staple s in such manner that when the padlock t is engaged in said staple the cover q is securely locked on the casing c. The top of the cover is provided with a glass protected opening u, through which the record paper h is observable. A strip of flexible material v, as india rubber, may be placed between the casing c and the edge of the cover q, to make the joint between them water-tight. The flexible arm o is provided with a boss or lug w, against which the side of the cover q, bears to cause the roller m to press on and force the paper h against the feed roller l; and when the cover is removed the roller m is free to move away from the feed roller l to permit of the ready adjustment of the paper h between the rollers.

A visual speed indicator x, adapted to move in unison with the puncturing device n, as hereafter described, is seen through a glass covered opening in the top of the casing c. A plug y screwed or otherwise secured to the top of the casing covers an opening therein, through which the operating devices may be lubricated and the controlling springs of the governor adjusted. The apparatus is provided with an alarm or sound producing device, which may be put in action at will by the manipulation of the lever z, which may be accomplished from any part of the vehicle by means of a connecting cord.

To the shaft f, which is rotated at speeds proportionate to the rates of travel of the vehicle, is secured the controller, whose function is to govern and regulate the movement of the indicating and recording devices, and which may be of the nature of a centrifugal governor as shown, comprising a bar 1 rigidly attached to the shaft f, two weights 2, 2 carried on arms pivoted at 3, 3 to the ends of the bar 1; links 4, 4 connected to the arms of the weights 2, 2 at points equidistant from their pivots 3, 3; and springs 5, 5, attached by one of their ends to the extensions 6, 6 of the links, and by their other ends, through the medium of adjusting means, as screws and nuts, to the extensions 7, 7 of said links; the arrangement of the parts of this mechanism being such that the springs 5, 5 oppose the centrifugal force acting on the weights 2, 2 tending at all times to move said weights towards the axis of the governor, and being capable of adjustment they may be so set that the weights will move through their range of action commensurate with speeds it is desired to indicate by the apparatus, and that there is a perfect balance at all times of all the parts. On the shaft f is fitted to slide a sleeve 8 provided with arms or plates in which are formed cam slots 9, 9 through which extend studs or rollers 10, 10 secured to the ends of the weights 2, 2. These slots 9, 9 are so shaped that the sleeve 8 will move in accordance with the requisite or desired movements of the record marking device and the visual speed indicator, which are suitably connected to the sleeve, as hereafter described. A portion 11, 11 of the inner ends of each of the slots 9, 9 are preferably straight, or radial in direction, so that the weights 2, 2 will not impart any movement to the sleeve 8 until the minimum speed which it is deemed advisable to record is exceeded.

The permanent record producing device consisting of the puncturing point n is carried at one end of a lever 12, which is pivotally connected to an arm 13 secured to a shaft 14, fitted to rock in lugs 15, 15 on the base plate a; and to this shaft 14 is also secured an arm 16 formed with studs or rollers 17 at its upper end to engage with a groove 18 in the sleeve 8. The other end of the lever 12 has a pin 19 arranged to work in the slot 20 formed in an extension of a lever 21, fitted to rock on a stud 22 secured in the wall b. This lever is spring actuated, whereby it is normally held in upward position against the stop pin 23, and when in this position the puncturing point n is held beneath and away from the record paper h, in whatever position the lever 12 may be set by the action of the speed indicator controller on the sleeve 8. A swinging arm or lever 24 also has its bearing on the stud 22; it is flat and resilient and is provided with a lug 25 arranged to bear on a cam 26, fitted to rotate on the inner boss of the central bearing d, and is controlled and rotated by the main shaft f, through a simple system of gearing, at a speed very much below that of the shaft, whose speed has to be somewhat high for the governing device to properly perform its function, their ratio of speeds being such that a revolution of the cam will represent any selected unit of distance, for instance it may make one revolution for each mile, or fraction of a mile, run by the vehicle. This speed reducing gear consists of four flat gear wheels 27, 28, 29, and 30 of substantially the same size but having different number of teeth; the wheel 27 is secured to the cam 26 and meshes into wheel 29, which with wheel 30, to which it is rigidly fastened, revolves on a stud 31 projecting from the rear of the bar 1, and the wheel 30 meshes into wheel 28, which is rigidly secured on the end of the boss of the bearing d. Wheels 29 and 30 are counterbalanced by a weight 32, secured, diametrically thereto, on the bar 1. To the lever 24 is pivoted a latch 33 whose upper end is formed to catch over stud 34 projecting from the lever 21, and is caused to coact therewith by a spring 35; connected to the latch and to an extension 36 of the lever 21, the arrangement being such that the spring also acts to raise the lever 21 and hold it against the stop 23. The lower end of the latch 33 has an arm 37 which strikes against an adjustable stop 38 when the lever 24 is moved towards the axis of the shaft, and so causes the latch to release the lever 21. The lever 24 is thus moved, and the lug 25 is held against the cam 26 by a spring 39, one end of which is fastened to an arm 40 of a link 41, which is pivoted to the lever 24 by one of its ends and carries at its other end a pawl lug 42, arranged to engage a ratchet wheel 43, of the record paper feeding device; the spring 39 so acts on the link 41 that the pawl lug 42 is held against said ratchet wheel 43, and its other end is fastened to a retaining pawl 44, which is pivoted at 45 to the wall $b$ and which locks the ratchet wheel as it is moved by the pawl lug 42. It will thus be observed that this spring 39 has a triple duty to perform, it holds the link 41 in proper position for the pawl lug 42 to operate the ratchet wheel 43, it moves the lever 24 in opposition to the action of the cam 26, and it controls the retaining pawl 44 of the ratchet wheel 43; and it will also be seen that the spring 35 performs two functions, it raises the lever 21 and it causes the latch 33 to engage with this lever and so compels it to move with the lever 24, when this lever is swung on the pivot 22 by the spring 39, which happens as the lug 25 leaves the highest parts of the cam 26; and as the fall or movement therefrom is sudden the puncturing point $n$ is caused to be snapped towards and suddenly pierce the paper $h$, but is instantly withdrawn because as the puncturing occurs the arm 37 of the latch 33 contacts with the stop 38 thereby moves its upper end away from the lug 34 and allows the spring 35 to restore the lever 21 to its normal position, in which it holds the point $n$ of the lever 12 away from the paper $h$. This sudden trigger-like action of the puncturing is very advantageous, it insures clearly defined puncture marks under all conditions of use of the apparatus on a moving vehicle. The upward movement of the paper while being punctured is resisted by the edge 58 of the end of the glass covered opening $v$ of the case cover $q$.

When the vehicle is going ahead the cam rotates in the direction indicated by the arrow, at Fig. 4, and as it is in positive communication with one of the wheels, or other suitable moving part of the vehicle, it moves at speeds commensurate with those of the vehicle; and to provide for prevention of injury to the apparatus should the vehicle be run backwards when the lug 25 of the lever 24 is at a low part of the cam 26 circular inclined grooves 46 are formed in the rear side of the cam, into which the lug will enter, the flexibility of the lever 24 permitting it to be depressed sufficiently for the lug to pass behind the cam and be snapped over the edge should the backward movement carry the inclined groove of the cam over and beyond the lug 25.

The feed roller $l$ is carried on the end of the shaft 47, by a screw thread or other suitable attachment, and this shaft has bearings in the end walls of the casing, at the upper part thereof, and the ratchetwheel 43 is secured to it near the end wall $b$.

The visual indicator, is shown as a series of numbers, between the minimum speed it is desired to indicate and the maximum speed the apparatus is designed to be used under, on a segmental plate $x$ carried in the end of an arm 48 immediately beneath the top of the casing, the opening through which this indicator is visible being sufficiently long for two of the numbers to be seen, so that the speed of the vehicle may be readily ascertained, an index mark at the center of the opening clearly showing the rate of travel, the figures preferably indicating miles per hour. The arm 48 is pivoted at 49 preferably to the upper end of post 50 which extends from the base $a$, it has a lateral extension 51 which by a pin and slot connection 52 joins the upper end of the arm 13, whereby said indicator $x$ is caused to move in unison with the record marking device $n$.

To produce a sound, at will, that will inform the occupants of the vehicle when the prescribed speed limit is being exceeded, which is supposed, by the illustration, in this case to be 10 miles per hour, a small hammer 53 carried on the end of a rod extending from the sleeve 8 strikes a gong or other sound giving device, shown as a spring-plate or bar 43 rigidly secured by its lower end to the base $a$, it being so shaped that when in normal position it is out of range of the revolving hammer at all speeds of the vehicle, as shown by the dotted lines in Fig. 4, and is also out of range of said hammer, even when pressed forward to be within the circle of motion of the hammer, when the speed is at or below the prescribed limit; the hammer at such times being in a plane outside of the edge of the spring bar 54, as shown at Fig. 5. Behind the spring bar 54 is a tappet 55 carried by a shaft 56, having bearings in a lug on the base $a$ and in the end wall $b$, the operating lever $z$ being connected to the end of this shaft which projects beyond the wall $b$. Now, by the manipulation of this lever $z$, as before described, the spring bar 54 is pressed forward and is struck by the hammer 53, but, only when the sleeve 8 has been moved by the speed indicator's controller to bring the plane of rotation of the hammer in front of the spring bar 54.

It will be understood that the permanent record of miles traveled and speeds of the vehicle at determined intervals may be made to meet special requirements; the strip of paper h will preferably have longitudinal divisions or markings thereon which will indicate the rates of speed by the punctures made by the point n, and vertical divisions or markings to indicate the miles run; and these divisions, as shown at Fig. 9, which is an illustrative example of a record strip, may be suitably numbered, the horizontal markings, for instance, by the numbers 10, 14, 18, 22, 26 and 30, which for ordinary purposes will give a sufficiently close guide for the ascertainment of the actual speeds of different parts of a run, and the vertical markings may, as for instance, be numbered to indicate each succeeding run of five miles, as shown by the figures 10, 15, 20, and so forth, throughout the whole length of a record strip if desired, or these mile indicators may be divided into sections of any number of miles run. In this example the puncture marks 57 are shown giving speed records at every half mile; this feature, of course, may be varied as required, any number of miles or any fractional parts of a mile run may be indicated by appropriately proportioning the speed of the apparatus to that of the vehicle and the controlling gears and cam of the apparatus.

I claim as my invention:

1. In a speed indicator and recorder, in combination, means for intermittently feeding a record receiver in accordance with distances or movements to be recorded; a driving connection for actuating the feeding means from the device whose speeds and movements are to be recorded; a puncturing device; means for setting it transversely to the direction of the feed of the record receiver, and relatively to the speeds to be recorded; and means for causing the puncturing device to pierce the record receiver during its intervals of rest.

2. A movement and speed recorder, comprising a record receiving strip marked longitudinally to indicate rates of speeds and marked transversely to indicate distances or movements to be recorded; means for intermittently feeding the strip in uniformity with the units of the distances or movements to be recorded; a puncturing device; means for setting it in different positions athwart the strip; means for causing it to pierce the strip to produce permanent records thereon of distances or movements and the rate of speed at each unit of measurements; and driving connections for actuating the feeding means and the puncturing device.

3. A movement and speed recorder, comprising a record receiving strip having longitudinal and transverse indicating lines; a table over which the strip is fed; a feeding device at one end of the table for feeding the strip over the table in conformity with the units of distances to be recorded; a puncturing device normally located beneath the table; means for setting and means for actuating the puncturing device to cause it to move transversely to the strip and to pass through an opening in the table and puncture the strip in positions to indicate the rates of speeds and the units of movements.

4. A movement and speed recorder, comprising a record receiving strip having longitudinal and transverse indicating lines; a table over which the strip is fed; a feeding device at one end of the table for feeding the strip over the table in conformity with the units of distances to be recorded; a friction guide through which the strip passes as it is drawn to the table; a puncturing device normally located beneath the table; means for setting and means for actuating the puncturing device to cause it to move transversely to the strip and to pass through an opening in the table and puncture the strip in positions to indicate the rates of speed and the units of movements.

5. In a movement and speed recorder, in combination, a receptacle adapted to hold a record receiving strip in roll form; a table above the receptacle; a friction guide through which the strip passes as it is drawn on to the table at one end; a feed roller and a pressure roller at the other end of the table between which the strip is fed; a receptacle for holding the strip as it passes from the feed roller; means for uniformly intermittently actuating the feed roller in accordance with the degrees of movements to be recorded; a marking device normally located beneath the table near the opposite end to the feed roller; means for setting and means for actuating the marking device to cause it to pass through a slot in the table and mark the strip.

6. In a recording apparatus, in combination, a casing inclosing the operating mechanisms; two recesses formed in the end of the casing separate and divided from the mechanism department; a record receiving strip located in one of the recesses; means for drawing the strip from this recess and feeding it into the other recess; means for marking the strip during its passage from one recess to the other to indicate thereon the rates of speed and distances or degrees of movement to be recorded; and a cover attached to the casing inclosing the two recesses for securely protecting the strip before, after and while receiving the record markings.

7. In a recording apparatus, in combination, a casing inclosing the operating mechanisms; two recesses formed in the end of the casing separate and divided from the mechanism department; a record receiving strip located in one of the recesses; means for drawing the strip from this recess and feeding it into the other recess; means for marking the strip during its passage from one recess to the other to indicate thereon the rate of speed and distances or degrees of movement to be recorded; a cover attached to the casing inclosing the two recesses for securely protecting the strip before, after and while receiving the record markings, and having a glass covered opening through which that portion of the strip between the means for marking and the means for feeding the strip is visible.

8. In a recording apparatus, in combination, a casing inclosing the operating mechanisms; two recesses formed in the end of the casing separate and divided from the mechanism department; a record receiving strip located in one of the recesses; means for drawing the strip from this recess and feeding it into the other recess; means for marking the strip during its passage from one recess to the other, to indicate thereon the rates of speed and distances or degrees of movement to be recorded; and a cover extending over the top and down the end of the casing, provided with pins adapted to enter holes in the top of the casing and having an opening in its end part adapted to fit over a boss on the end of the casing.

9. In a recording apparatus, in combination, a casing inclosing the operating mechanisms; two recesses formed in the end of the casing separate and divided from the mechanism department; a record receiving strip located in one of the recesses; means for drawing the strip from this recess and feeding it into the other recess; means for marking the strip during its passage from one recess to the other to indicate thereon the rates of speed and distances or degrees of movement to be recorded; a cover extending over the top and down the end of the casing, provided with pins adapted to enter holes in the top of the casing and having an opening in its end part adapted to fit over a boss on the end of the casing; and a lock for securing the lower part of the end of the cover to the end of the casing.

10. In a recording apparatus, in combination, a casing inclosing the operating mechanisms; two recesses formed in the end of the casing separate and divided from the mechanism department; a record receiving strip located in one of the recesses; means for drawing the strip from this recess and feeding it into the other recess; means for marking the strip during its passage from the one recess to the other to indicate thereon the rates of speed and distances or degrees of movement to be recorded; a cover attached to the casing for securely protecting the strip before, after and while receiving the record markings; and a flexible packing located between the edge of the cover and the adjacent parts of the casing.

11. In a recording apparatus, in combination, a casing inclosing the operating mechanisms; two recesses formed in the end of the casing separate and divided from the mechanism department; a record receiving strip located in one of the recesses; means for drawing the strip from this recess and feeding it into the other recess; a table over which the strip is drawn having a slit or opening therein; a puncturing device normally located beneath the table; means for setting and means for actuating the puncturing device to cause it to pass through the opening in the table and puncture the strip; and a cover attached to the casing to protect the strip, its feeding and its puncturing device, and having a glass covered opening through which a portion of the strip, punctured, is visible, the edge of one end of said opening acting as a stop to hold the strip down while being punctured.

12. In a recording apparatus, in combination, a casing inclosing the operating mechanisms; two recesses formed in the end of the casing separate and divided from the mechanism department; a record receiving strip located in one of the recesses; a feeding roller in the other recess; a pressure roller adapted to move towards and from the feeding roller; a cover attached to the casing to protect the record receiving strip and adapted to force the pressure roller towards the feeding roller; and means for rotating the feeding roller, whereby the strip is fed from its holding recess to the other one in accordance with the degrees of movement to be recorded.

13. In a recording apparatus, in combination, a casing inclosing the operating mechanisms; two recesses formed in the end of the casing separate and divided from the mechanism department; a record receiving strip located in one of the recesses; means for drawing the strip from this recess and feeding it into the other recess; means for marking the strip during its passage from one recess to the other to indicate thereon the rates of speed and distances or degrees of movement to be recorded; a cover extending over the top and down the end of the casing, provided with pins adapted to enter holes in the top of the casing and having an opening in its end part adapted to fit over a boss on the end of the casing; and a flexible packing located between the edge of the cover and the adjacent parts of the casing.

14. In a recording apparatus, in combination, a casing inclosing the operating mechanisms; two recesses formed in the end of the casing separate and divided from the mechanism department; a record receiving strip located in one of the recesses; a feeding roller in the other recess; means for rotating the feeding roller; a pressure roller; an arm hinged at one end to the casing and carrying the pressure roller at its other end, and having a lug or projection on its outer side; and a cover attached to the casing to protect the record receiving strip and adapted to bear on the lug of the arm to force the pressure roller towards the feeding roller.

15. In an apparatus of the character specified, in combination, a controller; a connection between the controller and a machine the speed and movements of which are to be indicated; a visual speed indicator; means for setting the visual speed indicator by the action of the controller; a sound producing device normally in inoperative position; means for setting the sound producing device in operative position, at will; means under the influence of the controller adapted to act on the sound producing device when it is set in operative position and when the rate of speed is in excess of a predetermined or a prescribed limit of speed; means for feeding and means for marking a record receiver; and connections between the controller and the record receiver marking means.

16. In an apparatus of the character specified, in combination, a controller; a connection between the controller and a machine the speed and movements of which are to be indicated; means for feeding a record receiver; a rock shaft connected to and caused to rock in unison with the controller; an arm on the rock shaft; a lever pivoted to the end of the arm, having at one end a puncturing device; means periodically actuated in accordance with selected units of movement and having connection with the other end of the lever whereby the puncturing device is caused to pierce the record receiver; a scale of numbers carried on a pivoted arm; and a connection between this pivoted arm and the arm on the rock shaft.

17. In an apparatus of the character specified, in combination, a controller; a connection between the controller and a machine the speed and movements of which are to be indicated; means for feeding a record receiver; a rock shaft connected to and caused to rock in unison with the controller; an arm on the rock shaft; a lever pivoted to the end of the arm, having at one end a puncturing device; a lever having a pin and slot connection with the other end of the puncturing device lever; and means for imparting a quick back and forth movement to the pin and slot connection of the two levers, whereby the puncturing device is caused to snap through the record receiver.

18. In an apparatus of the character specified, in combination, a shaft; means connecting it to a machine the movements of which are to be recorded; a cam having a gradual rise ending abruptly and formed with an inclined groove at its rear side; speed reducing gearing between the shaft and cam; a spring actuated flexible lever having a stud to coact with the cam and moved to and beyond the high point of the cam when the cam is rotated in one direction and caused by the resilience of the lever to pass into and through the inclined groove when the cam is rotated in the other direction.

19. In an apparatus of the character specified, in combination, a shaft; means connecting it to a machine the movements of which are to be recorded; a cam; speed reducing gearing between the shaft and cam; a spring actuated lever having a stud to coact with the cam; means for feeding a record receiver; means for marking it; a lever actuating the marking means; a latch carried by a cam actuated lever and adapted to engage the other lever; a spring between the latch and this other lever; and a stop for releasing the latch as the cam actuated lever is moved by its spring.

20. In an apparatus of the character specified, in combination, a shaft; means connecting it to a machine the movements of which are to be recorded; a cam; speed reducing gearing between the shaft and cam; a spring actuated lever having a stud to coact with the cam; means for feeding a record receiver; means for marking it; a lever actuating the marking means; a latch carried by a cam actuated lever and adapted to engage the other lever; a spring between the latch and this other lever; and an adjustable stop for releasing the latch as the cam actuated lever is moved by its spring.

21. In an apparatus of the character specified, in combination, a shaft; means connecting it to a machine the movements of which are to be recorded; a cam; speed reducing gearing between the shaft and cam; a spring actuated lever having a stud to coact with the cam; means for feeding a record receiver; means for marking it; a lever actuating the marking means; a latch carried by a cam actuated lever and adapted to engage the other lever, a spring between the latch and this other lever; an adjustable stop for releasing the latch as the cam actuated lever is moved by its spring; and a stop for limiting the movement of the marking device operating lever.

22. In an apparatus of the character specified, in combination, a shaft; means connecting it to a machine the movements of which are to be recorded; a cam; speed reducing gearing between the shaft and cam comprising two connected gear wheels fitted to rotate on a stud carried by a bar secured to the shaft a stationary gear wheel concentric to the shaft meshing into one of the connected wheels, and a gear wheel secured to the cam meshing into the other one of the connected wheels and whose axis of rotation is also connected with that of the shaft; a spring actuated lever having a stud to coact with the cam; means for feeding a record receiver; means for marking it; and means connecting the spring actuated lever and the marking means.

23. In an apparatus of the character specified, in combination, a lever; means for moving the lever positively in one direction; a feed roll for feeding a record receiver, a ratchet wheel on the shaft of the feed roll; a link pivoted to the lever having a pawl or toe for acting on the ratchet wheel; and a spring attached to the link in such manner that the pawl or toe of the link is pressed towards the ratchet wheel and the lever is held against its positive moving means.

24. In an apparatus of the character specified, in combination, a lever; means for moving the lever positively in one direction; a feed roll for feeding a record receiver; a ratchet wheel on the shaft of the feed roll; a link pivoted to the lever having a pawl or toe for acting on the ratchet wheel; a locking pawl for the ratchet wheel; and a spring attached to the link and the locking pawl in such manner that the pawl or toe of the link is pressed towards the ratchet wheel and the lever is held against its positive moving means and the locking pawl pressed towards the ratchet wheel.

In testimony whereof I have hereunto subscribed my name, this 29th day of May, 1905.

ALFRED SHEDLOCK.

Witnesses:
  ARTHUR C. BLATZ,
  JAMES L. BARGEN.